(12) United States Patent
Nishiki et al.

(10) Patent No.: US 12,528,144 B2
(45) Date of Patent: Jan. 20, 2026

(54) TABLE DEVICE

(71) Applicant: DMG MORI CO., LTD., Nara (JP)

(72) Inventors: Takahiro Nishiki, Nara (JP); Keisuke Ikai, Nara (JP)

(73) Assignee: DMG MORI CO., LTD., Nara (JP)

( * ) Notice: Subject to any disclaimer, the term of this patent is extended or adjusted under 35 U.S.C. 154(b) by 362 days.

(21) Appl. No.: 18/020,693

(22) PCT Filed: Aug. 12, 2020

(86) PCT No.: PCT/JP2020/030654
§ 371 (c)(1),
(2) Date: Feb. 10, 2023

(87) PCT Pub. No.: WO2022/034647
PCT Pub. Date: Feb. 17, 2022

(65) Prior Publication Data
US 2023/0302591 A1 Sep. 28, 2023

(51) Int. Cl.
B23Q 1/64 (2006.01)
B23Q 1/72 (2006.01)
B23Q 11/00 (2006.01)

(52) U.S. Cl.
CPC ............ B23Q 1/64 (2013.01); B23Q 1/72 (2013.01); B23Q 11/0021 (2013.01)

(58) Field of Classification Search
CPC ........ F16F 15/366; F16F 15/32; F16F 15/322; F16F 15/286; B66F 3/08; B66F 3/24;
(Continued)

(56) References Cited

U.S. PATENT DOCUMENTS 5,943,919 A * 8/1999 Babinski .................. B66F 3/08
464/134
2007/0048101 A1* 3/2007 Beteille .............. B23Q 11/0021
409/168

FOREIGN PATENT DOCUMENTS

DE 102017106569 A 10/2018
DE 102017106569 A1 * 10/2018 ............... B23Q 1/26
(Continued)

OTHER PUBLICATIONS

European Search Report for related Application No. EP 20949509.2; report dated Jul. 11, 2023.
(Continued)

Primary Examiner — Tyrone V Hall, Jr.
(74) Attorney, Agent, or Firm — von Briesen & Roper, s.c.

(57) ABSTRACT

The present invention includes a table (2) for placing a workpiece (Wa) thereon, a supporting mechanism (10) including a rotary shaft (15, 16) and supporting the table (2) so as to be able to rock the table (2) about an axial center of the rotary shaft (15, 16), a first drive motor (20) rotating the rotary shaft (15) of the supporting mechanism (10) to rock the table (2), a balance imparting mechanism (30) imparting a balance load to the rotary shaft (15) in accordance with a position of rocking of the table (2), and a controller (50) controlling the first drive motor (20). The balance imparting mechanism (30) includes an eccentric disc (31) having a circular plate shape and connected at a position eccentric from a center thereof to the rotary shaft (15), a housing (32) holding an outer periphery of the eccentric disc (31) via a bearing (33), and a load imparting unit (35) imparting the balance load to the housing (32) in a direction intersecting an axis of the rotary shaft (15).

11 Claims, 6 Drawing Sheets

(58) Field of Classification Search
CPC ............... B23Q 1/5406; B23Q 1/5437; B23Q 11/0021; B23Q 11/001; B23Q 11/0017; B23Q 11/0032; B23Q 11/0035
See application file for complete search history.

(56) References Cited

FOREIGN PATENT DOCUMENTS

| EP | 1677028 | A1 | 7/2006 |
|----|---------|----|--------|
| EP | 3269497 | A1 | 1/2018 |
| JP | H0375943 | U | 7/1991 |
| JP | 2005028539 | A | 2/2005 |
| JP | 2016168641 | A | 9/2016 |
| JP | 2016215308 | A | 12/2016 |
| JP | 2016221648 | A | 12/2016 |
| JP | 2017030100 | A | 2/2017 |
| JP | 2017056508 | A | 3/2017 |
| JP | 2017056509 | A | 3/2017 |
| KR | 20110061025 | A * | 6/2011 |
| WO | 2008029453 | A1 | 3/2008 |
| WO | 2009131082 | A1 | 10/2009 |
| WO | 2015129576 | A1 | 9/2015 |

OTHER PUBLICATIONS

International Search Report for related Application No. PCT/JP2020/030654; report dated Oct. 27, 2020.

* cited by examiner

TABLE DEVICE

TECHNICAL FIELD

The present invention relates to a table device that has a table having a placement surface for placing a workpiece thereon and is configured to be able to rock the table.

BACKGROUND ART

The table device as mentioned above has been mostly provided in a machine tool. For example, machining a workpiece placed on the table while rocking the table about a rotary shaft parallel to the placement surface of the table enables machining of a complex shape in the workpiece.

Such a table device is typically configured to rock the table by rotating the rotary shaft by means of an appropriate drive motor. Such rocking of the table produces a torque (unbalanced torque) that is caused by the table's own weight and varies in accordance with the angle of rocking of the table, and this torque acts on the drive motor. Therefore, the drive motor needs to be a high-output motor which is capable of withstanding such an unbalanced torque. However, employing a high-output motor increases the table device cost, and also unnecessarily increases the table device size since such a motor is larger in size.

To solve these problems, a balancer device for rotary shaft as disclosed in Patent Literatures 1 and 2 listed below and a tilt indexing device as disclosed in Patent Literatures 3 and 4 listed below have been proposed that are configured to apply to the rotary shaft a counter torque which cancels out the unbalanced torque.

Specifically, the balancer device disclosed in Patent Literatures 1 and 2 has assist-torque generating means that generates an assist torque for at least partially compensating an unbalanced torque acting on a rotary shaft. The assist-torque generating means includes a cam member fixed to the rotary shaft, a cam following member following the cam member in contact therewith, and biasing means biasing the cam following member toward the cam member so as to apply the assist torque to the rotary shaft via the cam member. In this balancer device, an assist torque for at least partially compensating the unbalanced torque is applied via the cam member to the rotary shaft by the biasing means.

On the other hand, the tilt indexing device disclosed in Patent Literatures 3 and 4 has a frame having a pedestal and a pair of support bases erected with a spacing therebetween on the pedestal, a pair of rotary shafts respectively supported by the pair of support bases and each rotatably supported via a bearing by the associated support base, a table having a base portion for placing a workpiece thereon and a pair of arm portions supporting the base portion and supported at the pair of arm portions by the pair of rotary shafts, a drive device arranged on at least one of the pair of support bases to rotationally drive the table via the rotary shafts, and a torque compensation device compensating an unbalanced torque applied to the rotary shaft when the table is brought into a tilted state.

At least one of the pair of rotary shafts is composed of an eccentric shaft having a pair of axial portions spaced from each other in the axial direction thereof with axial centers thereof coinciding with each other as viewed in the axial direction, an eccentric portion located between the pair of axial portions in the axial direction and at a position eccentric from the axial centers of the pair of axial portions, and support portions connecting the eccentric portion to the pair of axial portions. This eccentric shaft is supported at the axial portions thereof via the bearing by the associated support base, and the torque compensation device is connected to the eccentric portion of the eccentric shaft as the rotary shaft. Note that the torque compensation device is composed of a fluid pressure cylinder that has a rod connected to the eccentric portion of the eccentric shaft.

In this tilt indexing device, a torque for compensating the unbalanced torque acting on the rotary shaft is applied to the rotary shaft by the torque compensation device composed of a fluid pressure cylinder, whereby the unbalanced torque acting on the rotary shaft is reduced.

CITATION LIST

Patent Literature

Patent Literature 1: Japanese Unexamined Patent Application Publication No. 2016-168641
Patent Literature 2: Japanese Unexamined Patent Application Publication No. 2017-30100
Patent Literature 3: Japanese Unexamined Patent Application Publication No. 2017-56508
Patent Literature 4: Japanese Unexamined Patent Application Publication No. 2017-56509

SUMMARY OF INVENTION

Technical Problem

However, the above-described conventional balancer device and tilt indexing device have the following problems. The balancer device has the configuration in which the outer peripheral surface of the cam member that has a circular cross section and the outer peripheral surface of the cam following member that also has a circular cross section are in line contact with each other, and loads are therefore likely to concentrate on the line contact portion. This leads to a problem that the cam member and the cam following member are damaged if a high unbalanced torque acts. Therefore, this conventional balancer device cannot be applied to a large-sized table device in which a high unbalanced torque is produced.

Further, recent table devices are provided with a clamping mechanism for automatically clamping a workpiece placed on the table and various sensors, and the clamping mechanism and the sensors have pipes and wires connected thereto. Accordingly, the rotary shaft for rocking the table is composed of a hollow shaft so that the pipes and wires are inserted in the follow portion of the rotary shaft and connected to the clamping mechanism and the sensors.

However, the above-described tilt indexing device has the configuration in which the distal end of the rod of the fluid pressure cylinder as the torque compensation device is connected to the eccentric portion of the eccentric shaft as the rotary shaft and turns about the center axis of the rotary shaft, in other words, the distal end of the piston rod performs a circular motion intersecting the center axis of the rotary shaft; therefore, even if the rotary shaft is hollow, it is impossible to insert pipes and wires into the hollow portion of the rotary shaft from the outside. Thus, this conventional tilt indexing device does not allow for arrangement of an automatic clamping mechanism and various sensors on the table.

The present invention has been achieved in view of the above-described circumstances, and an object of the invention is to provide a table device which is capable of handling an unbalanced torque higher than in conventional devices and allows pipes and wires to be inserted in a hollow rotary shaft.

Solution to Problem

To solve the above-described problems, the present invention provides a table device having:
a table for placing a workpiece thereon;
a supporting mechanism including a rotary shaft and supporting the table so as to be able to rock the table about an axial center of the rotary shaft;
a first drive motor configured to rotate the rotary shaft of the supporting mechanism to rock the table;
a balance imparting mechanism configured to impart a balance load to the rotary shaft in accordance with a position of rocking of the table; and
a controller configured to control the first drive motor,
the balance imparting mechanism including:
an eccentric disc having a circular plate shape and connected at a position eccentric from a center thereof to the rotary shaft;
a housing holding an outer periphery of the eccentric disc via a bearing; and
a load imparting unit configured to impart the balance load to the housing in a direction intersecting an axis of the rotary shaft.

In this table device, the table is rocked about the rotary shaft by rotation of the rotary shaft by the first drive motor under control by the controller. In this operation, a balance load corresponding to an unbalanced torque is imparted to the rotary shaft from the load imparting unit via the eccentric disc. Thereby, the unbalanced torque that acts on the first drive motor is reduced.

Note that the eccentric disc is held at the outer periphery thereof via the bearing by the housing so that the balance load acts on the eccentric disc in a distributed manner. This configuration allows a balance load higher than in conventional devices to act on the eccentric disc, and the eccentric disc will not be damaged even when such a high balance load acts thereon.

Further, the eccentric disc rotates about the center axis of the rotary shaft along with rotation of the rotary shaft, while the housing only moves up and down along with the rotation of the eccentric disc and does not perform a circular motion intersecting the center axis of the rotary shaft. Therefore, composing the rotary shaft of a hollow shaft and forming in the eccentric disc an opening corresponding to the hollow portion of the rotary shaft enables pipes and wires to be inserted into the hollow portion of the rotary shaft through the opening, which makes it possible to arrange an automatic clamping mechanism and various sensors on the table.

Note that the table device according to the present invention may have a configuration in which the rotary shaft of the supporting mechanism is arranged parallel to a placement surface of the table.

Further, the table device according to the present invention may have a configuration in which:
the load imparting unit includes a hydraulic cylinder;
the hydraulic cylinder has a cylinder connected to the housing and has a piston rod supported by a support member; and
either a connection between the cylinder and the housing or a connection between the piston rod and the support member is connected in a relatively pivotable manner.

Alternatively, the table device according to the present invention may have a configuration in which:
the load imparting unit includes a hydraulic cylinder;
the hydraulic cylinder has a piston rod connected to the housing and has a cylinder supported by a support member; and
either a connection between the piston rod and the housing or a connection between the cylinder and the support member is connected in a relatively pivotable manner.

In the table device having either one of these two configurations, the hydraulic cylinder is supplied with a fixed hydraulic pressure, whereby the balance load corresponding to the unbalanced torque is imparted to the rotary shaft.

Further, the table device according to the present invention may have a configuration in which:
the load imparting unit includes:
a ball screw supported to be rotatable about an axis thereof and connected at one end thereof to the housing;
a ball nut screwed with the ball screw;
a support member supporting the ball nut; and
a second drive motor configured to rotate the ball screw;
the second drive motor is controlled by the controller; and
a connection between the housing and the ball screw is connected in a relatively pivotable manner.

In the table device having this configuration, the second drive motor is driven under control by the controller and the ball screw is rotated by the second drive motor, so that the ball screw is moved in the axial direction thereof in accordance with the screwing with the ball nut. Thereby, a balance load corresponding to a thrust of the ball screw is imparted to the rotary shaft via the housing and the eccentric disc.

In this case, causing the controller to monitor a load acting on the first drive motor and control an output of the second drive motor such that the load falls within a predetermined allowable range enables a more exact balance load which cancels out the unbalanced torque acting on the first drive motor to act on the first drive motor, so that the unbalanced torque acting on the first drive motor is reduced more appropriately.

Advantageous Effects of Invention

In the present invention, a balance load corresponding to an unbalanced torque is imparted to the rotary shaft rocking the table from the load imparting unit via the eccentric disc, whereby the unbalanced torque that acts on the first drive motor is reduced.

Further, the eccentric disc is held at the outer periphery thereof via the bearing by the housing so that the balance load acts on the eccentric disc in a distributed manner. This configuration allows a balance load higher than in conventional devices to act on the eccentric disc, and the eccentric disc will not be damaged even when such a high balance load acts thereon.

Further, the eccentric disc rotates about the center axis of the rotary shaft along with rotation of the rotary shaft, while the housing only moves up and down along with the rotation of the eccentric disc and does not perform a circular motion intersecting the center axis of the rotary shaft. Therefore, composing the rotary shaft of a hollow shaft and forming in the eccentric disc an opening corresponding to the hollow portion of the rotary shaft enables pipes and wires to be inserted into the hollow portion of the rotary shaft through the opening, which makes it possible to arrange an automatic clamping mechanism and various sensors on the table.

DESCRIPTION OF EMBODIMENTS

Hereinafter, a specific embodiment of the present invention will be described with reference to the drawings.

Figure 1:
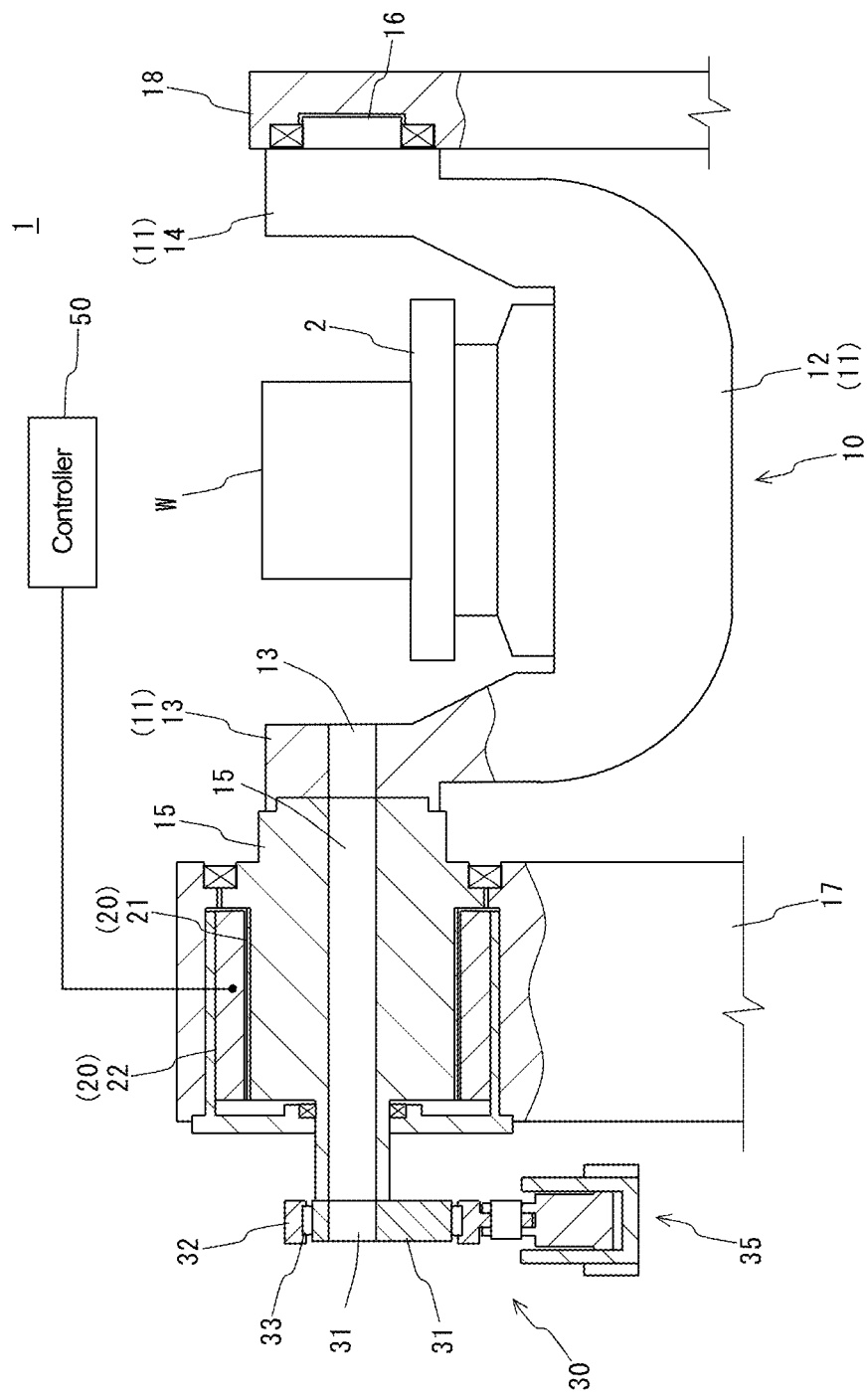
FIG. 1 is a front view, partially in cross section, of a table device according to an embodiment of the present invention.

A table device 1 according to this embodiment is provided, for example, in a machine tool such as a vertical machining center or a horizontal machining center. As illustrated in FIG. 1, the table device 1 has a table 2 for placing a workpiece Wa thereon, a supporting mechanism 10 supporting the table 2 in such a manner as to be able to rock the table 2, a drive motor 20 driving the supporting mechanism 10 to rock the table 2, a balance imparting mechanism 30 imparting a balance load to the supporting mechanism 10 in accordance with a position of rocking of the table 2, a controller 50 controlling the drive motor 20.

The supporting mechanism 10 includes a support base 11, a first rotary shaft 15, a second rotary shaft 16, a first support frame 17, and a second support frame 18. The support base 11 has a U-shaped cross section that is formed by a bottom portion 12 on which the table 2 is placed and a first arm 13 and a second arm 14 respectively extended upward from both sides of the bottom portion 12. The first rotary shaft 15 and the second rotary shaft 16 are respectively connected to upper-end outer side surfaces of the first arm 13 and second arm 14. The first support frame 17 holds the first rotary shaft 15 in such a manner as to allow the first rotary shaft 15 to rotate. The second support frame 18 supports the second rotary shaft 16 in such a manner as to allow the second rotary shaft 16 to rotate.

The first rotary shaft 15 and the second rotary shaft 16 are arranged coaxially with each other and arranged such that the center axes thereof are at a position shifted upward from a top surface of the table 2 when the bottom portion 12 of the support base 11 is at the lowest position. In FIG. 1, the first rotary shaft 15 is arranged such that the right and left ends thereof protrude from the first support frame 17. The right end of the first rotary shaft 15 is connected to the upper end of the first arm 13, and the left end of the first rotary shaft 15 is connected to the balance imparting mechanism 30. The first rotary shaft 15 is composed of a hollow shaft that has a through hole 15a along the axis thereof at the center thereof. The first arm 13 is provided with a through hole 13a formed to be coaxial with the through hole 15a of the first rotary shaft 15.

The first rotary shaft 15 is provided with a rotor 21 on the outer periphery thereof. The first support frame 17 is provided with an annular stator 22 that is arranged so as to fit around the rotor 21. The rotor 21 and the stator 22 constitute the drive motor 20 by which the first rotary shaft 15 is rotated about the axis thereof. The rotation of the first rotary shaft 15 causes the support base 11 and the table 2 supported by the support base 11 to rock about the axis of the first rotary shaft 15 and second rotary shaft 16. The gravities of these rocking bodies produce an unbalanced torque, and this unbalanced torque acts on the first rotary shaft 15 and the drive motor 20. Note that this unbalanced torque varies in accordance with an angle of rocking of the support base 11 and is maximum when the angle of rocking is ±90°. Further, the electrical power to be supplied to the stator 22 is controlled by the controller 50.

Figure 2:
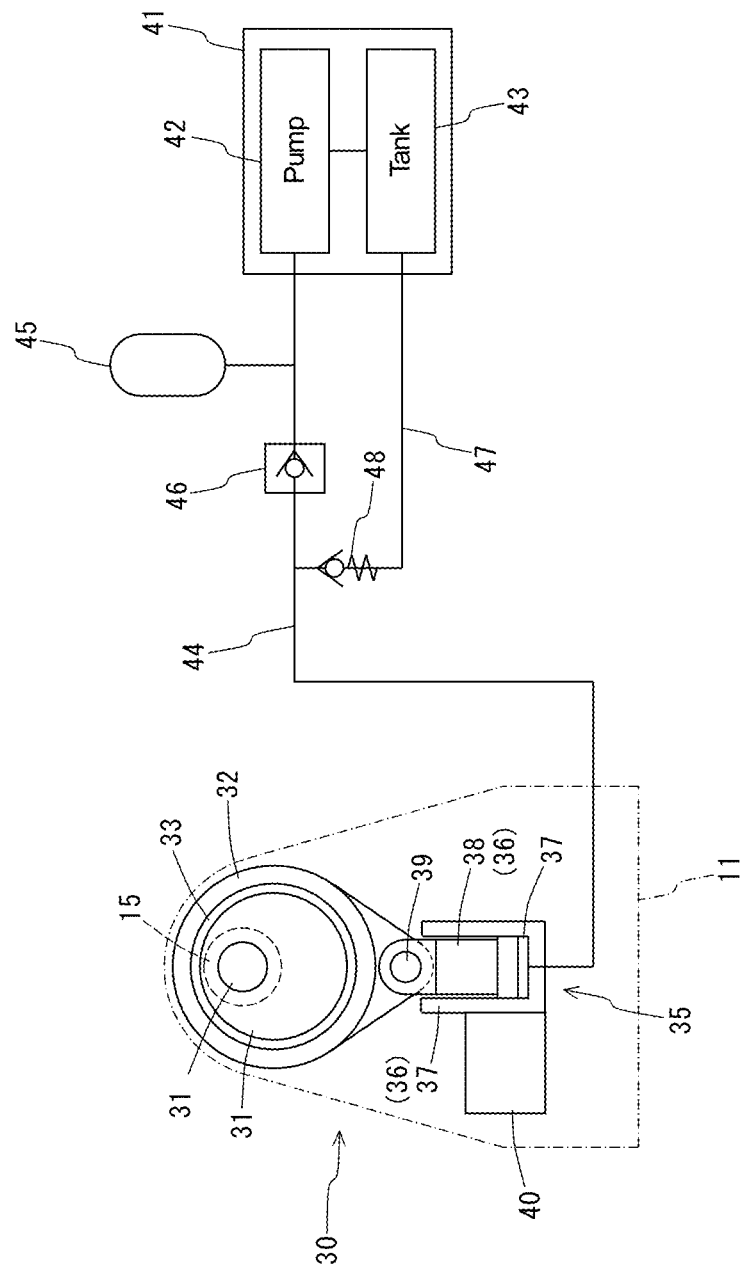
FIG. 2 is an illustrative diagram schematically showing a configuration of a balance imparting mechanism in the embodiment.

As illustrated in FIG. 2, the balance imparting mechanism 30 includes an eccentric disc 31, a housing 32, and a load imparting unit 35. The eccentric disc 31 has a circular plate shape and is connected at a position eccentric from the center thereof to the first rotary shaft 15. The housing 32 holds the outer periphery of the eccentric disc 31 via a bearing 33 that is constituted by a plurality of cylindrical elements (rolling elements) arranged to be in contact with an outer peripheral surface of the eccentric disc 31. The load imparting unit 35 imparts a balance load to the housing 32 in a direction intersecting the axis of the first rotary shaft 15. Note that the eccentric disc 31 is provided with a through hole 31a formed to be coaxial with the through hole 15a of the first rotary shaft 15.

The load imparting unit 35 includes a hydraulic cylinder 36 and a hydraulic unit 41 supplying a pressurized oil to the hydraulic cylinder 36. The hydraulic cylinder 36 has a cylinder 37 supported by a support member 40 and has a piston rod 38 connected at the distal end thereof to the lower end of the housing 32 via a pin 39 to be relatively pivotable about an axis parallel to the axis of the first rotary shaft 15 (i.e., about the axis of the pin 39).

The hydraulic unit 41 includes a tank 43 and a pump 42. The tank 43 stores a hydraulic oil. The pump 42 pressurizes the hydraulic oil stored in the tank and supplies the pressurized hydraulic oil to a hydraulic chamber 37a of the cylinder 37 through a supply pipe 44. The supply pipe 44 is provided with a check valve 46 and is connected at a point between the check valve 46 and the pump 42 to an accumulator 45. Further, the supply pipe 44 has a return pipe 47 branching off at a point between the check valve 46 and the cylinder 37 and leading to the tank, and the return pipe 47 is provided with a relief valve 48.

Thus, the hydraulic cylinder 36 is supplied with a pressurized oil at a fixed pressure by the hydraulic unit 41, whereby a fixed thrust is imparted to the housing 32 via the piston rod 38 of the hydraulic cylinder 36. The housing 32 transmits the thrust of the hydraulic cylinder 36 to the eccentric disc 31, toward the center thereof, via the bearing 33. Thereby, a torque that is obtained by multiplying a positional shift (deviation) between the center of the first rotary shaft 15 and the center of the eccentric disc 31 by the thrust is imparted to the first rotary shaft 15 from the eccentric disc 31. Note that this torque is a balance torque as a counter to the unbalanced torque and varies in accordance with an angle of rotation of the eccentric disc 31 about the first rotary shaft 15.

In the table device 1 according to this embodiment having the above-described configuration, the support base 11 and the table 2 supported by the support base 11 are rocked about the axis of the first rotary shaft 15 by rotation of the first rotary shaft 15 by the drive motor 20 under control by the controller 50.

In the case where this table device 1 is provided in a machine tool such as a machining center, machining a workpiece Wa placed on the table 2 while rocking the table 2 in the above-described manner enables machining of a complex shape in the workpiece Wa.

As described above, rocking of the support base 11 and table 2 causes an unbalanced torque produced by the gravities of these rocking bodies to act on the first rotary shaft 15 and the drive motor 20; however, a balance torque as a counter to this unbalanced torque is imparted to the first rotary shaft 15 by the balance imparting mechanism 30. Specifically, when the first rotary shaft 15 rotates about the axis thereof, the eccentric disc 31 also rotates about the axis of the first rotary shaft 15 and a thrust of the hydraulic cylinder 36 acts as a balance load on the first rotary shaft 15 via the eccentric disc 31. Thereby, the load to the drive motor 20 caused by the unbalanced torque is reduced. Note that, when the eccentric disc 31 rotates about the axis of the first rotary shaft 15, the housing 32 moves up and down in accordance with the engagement with the eccentric disc 31 while absorbing the deviation of the eccentric disc 31.

Figure 3:
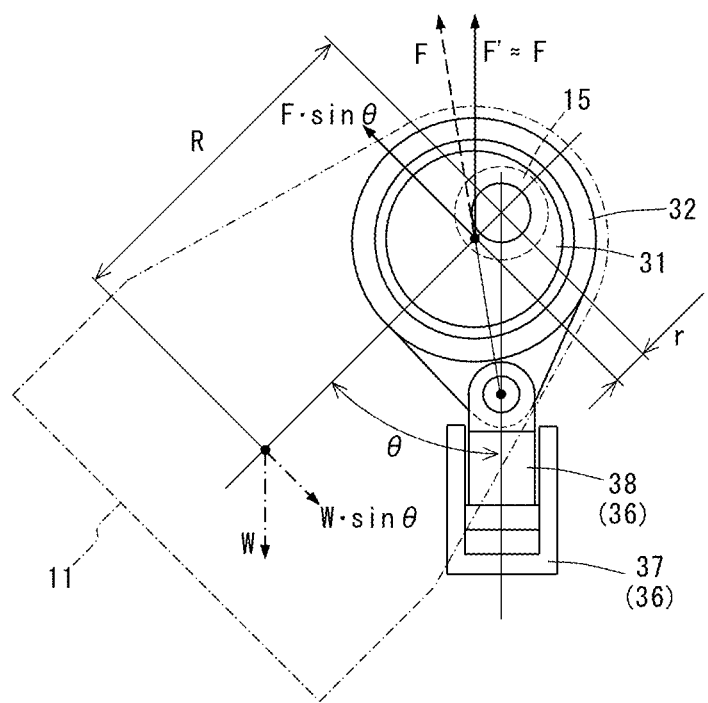
FIG. 3 is an illustrative diagram for illustrating operation of the balance imparting mechanism in the embodiment.

Here, the above-described balance load is described in more detail on the basis of FIG. 3. FIG. 3 shows a state where the support base 11 is rocked 45° to the left. Note that, in FIG. 3, the angle of clockwise rocking is plus. Therefore, the angle of counter-clockwise rocking is minus.

As illustrated in FIG. 3, the unbalanced torque Tu caused by the rocking body consisting of the support base 11, the table 2, and the workpiece Wa and acting on the first rotary shaft 15 is represented as follows, where W is the weight of the rocking body and R is the distance between the center of gravity of the rocking body and the center of the first rotary shaft 15:

$$Tu = R \cdot W \cdot \sin \theta.$$

On the other hand, the balance torque Tc acting on the first rotary shaft 15 is represented as follows, where r is the distance between the center of the eccentric disc 31 and the center of the first rotary shaft 15, F is the thrust acting toward the center of the eccentric disc 31 from the hydraulic cylinder 36, and the thrust F is assumed to be approximated by a vertical component force F' of the thrust F:

$$Tc = r \cdot F' \cdot \sin \theta = r \cdot F \cdot \sin \theta.$$

The balance torque Tc as a counter for canceling out the unbalanced torque Tu should be as follows:

$$Tc = Tu,$$

that is to say, $$R \cdot W \cdot \sin \theta = r \cdot F \cdot \sin \theta.$$

Therefore, the thrust (balance load) F for generating the balance torque Tc as a counter to the unbalanced torque Tu is as follows:

$$F = R \cdot W / r.$$

Figure 4:
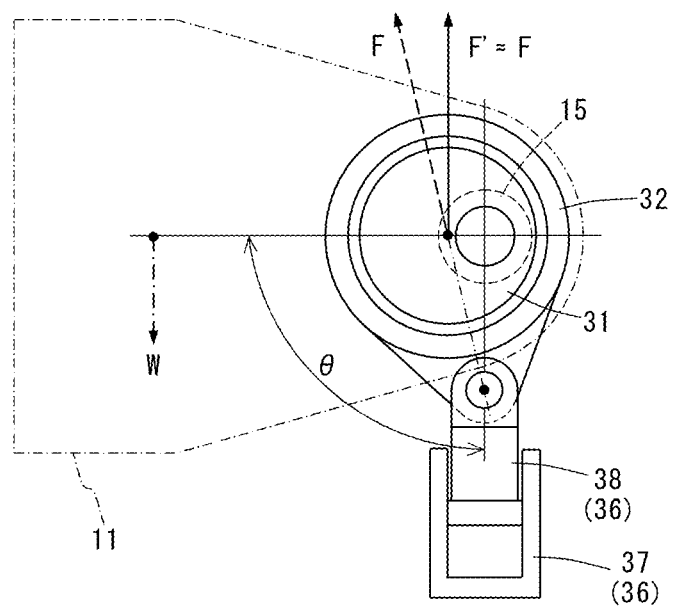
FIG. 4 is an illustrative diagram for illustrating the operation of the balance imparting mechanism in the embodiment.
Figure 5:
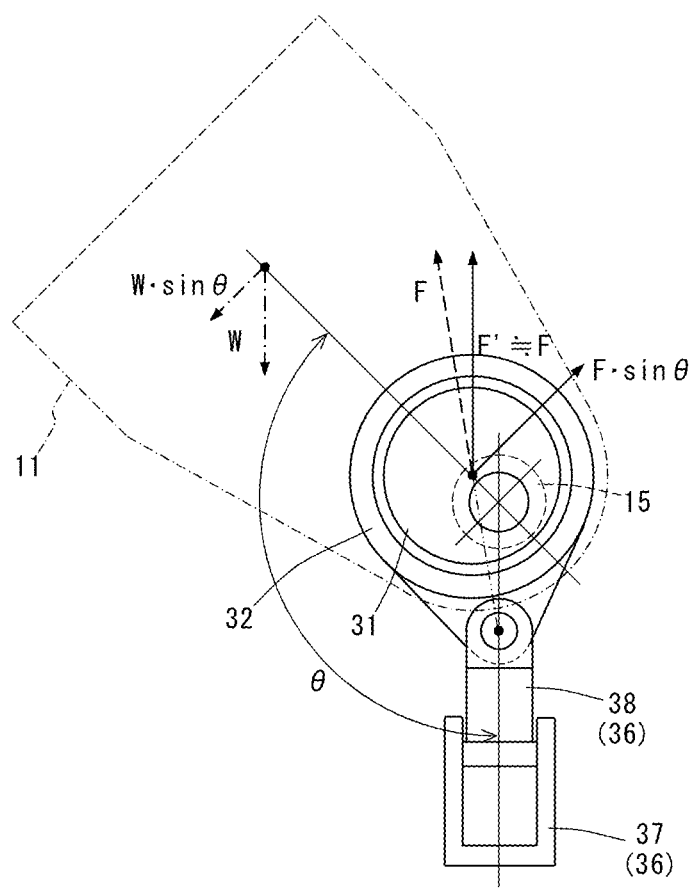
FIG. 5 is an illustrative diagram for illustrating the operation of the balance imparting mechanism in the embodiment.

In this connection, FIG. 4 shows a state where the support base 11 is rocked 90° to the left, and FIG. 5 shows a state where the support base 11 is rocked 135° to the left. The unbalanced torque Tu and the balance torque Tc in the state where the support base 11 is rocked 135° to the left as shown in FIG. 5 are equal to those in the state where the support base 11 is rocked 45° to the left as shown in FIG. 3. The unbalanced torque Tu and the balance torque Tc have their respective maximum values when the support base 11 is rocked 90° to the left as shown in FIG. 4.

As described above, in the table device 1 according to this embodiment, the balance torque Tc as a counter to the unbalanced torque Tu produced by rocking of the support base 11 and table 2 is imparted to the first rotary shaft 15 by the balance imparting mechanism 30, so that the load to the drive motor 20 caused by the unbalanced torque Tu is reduced.

Note that the eccentric disc 31 in this embodiment is held at the outer periphery thereof via the bearing 33 by the housing 32 so that the thrust F of the hydraulic cylinder 36 acts on the eccentric disc 31 in a distributed manner. This configuration allows a thrust F (balance load) higher than in conventional devices to act on the eccentric disc 31, and the eccentric disc 31 will not be damaged even when such a high balance load acts thereon.

Further, the eccentric disc 31 rotates about the axis of the first rotary shaft 15 along with rotation of the first rotary shaft 15, while the housing 32 only moves up and down along with the rotation of the eccentric disc 31 and does not perform a circular motion intersecting the axis of the first rotary shaft 15. Therefore, it is possible to insert pipes and wires through the through hole 31a of the eccentric disc 31, the through hole 15a of the first rotary shaft 15, and the through hole 13a of the first arm 13 to lead the pipes and wires to the top of the table 2, so that it is possible to arrange an automatic clamping mechanism and various sensors on the table 2.

Above has been described an embodiment of the present invention. However, it should be noted that the present invention is not limited to the above-described embodiment and can be implemented in other manners.

For example, the table 2 and support base 11 of the table device 1 according to the above-described embodiment are configured to be rocked about the axis of the first rotary shaft 15 and second rotary shaft 16 arranged parallel to the top surface of the table 2. However, the present invention is not limited to this configuration, and the table 2 and the support base 11 may be configured to be rocked about a rotary shaft arranged with the axis thereof extending in a direction intersecting the top surface of the table 2.

Further, the bearing 33 supporting the eccentric disc 31 in the above-described embodiment uses cylindrical rolling elements. However, the present invention is not limited to such a bearing and the bearing 33 may be constituted by a plurality of spherical rolling elements or may be composed of a sliding bearing.

Further, the table device 1 according to the above-described embodiment has the configuration in which the distal end of the piston rod 38 is relatively pivotably connected to the housing 32 via the pin 39. However, the present invention is not limited to this configuration, and the table device 1 may have a configuration in which the distal end of the piston rod 38 is fixed to the lower end of the housing 32 and the lower end of the cylinder 37 is relatively pivotably connected to the support member 40 via the pin 39. This configuration also achieves the same effects as those of the above-described table device 1.

Figure 6:
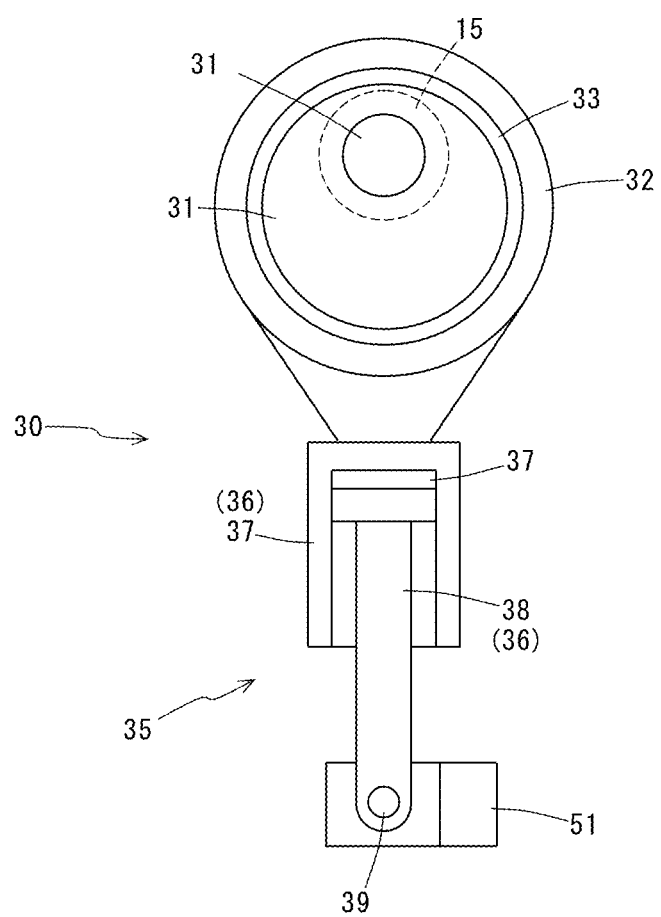
FIG. 6 is an illustrative diagram schematically showing a configuration of a balance imparting mechanism in another embodiment of the present invention.

Further, for example, the load imparting unit 35 may have the cylinder 37 connected at the bottom thereof to the lower end of the housing 32 and have the piston rod 38 pivotably supported by an appropriate support member 51 via the pin 39 as illustrated in FIG. 6. This configuration also achieves the same effects as those of the above-described table device 1.

Further, in this case, the load imparting unit 35 may have a configuration in which the bottom of the cylinder 37 and the lower end of the housing 32 are relatively pivotably connected to each other by the pin 39 and the distal end of the piston rod 38 is fixed to the support member 51.

Figure 7:
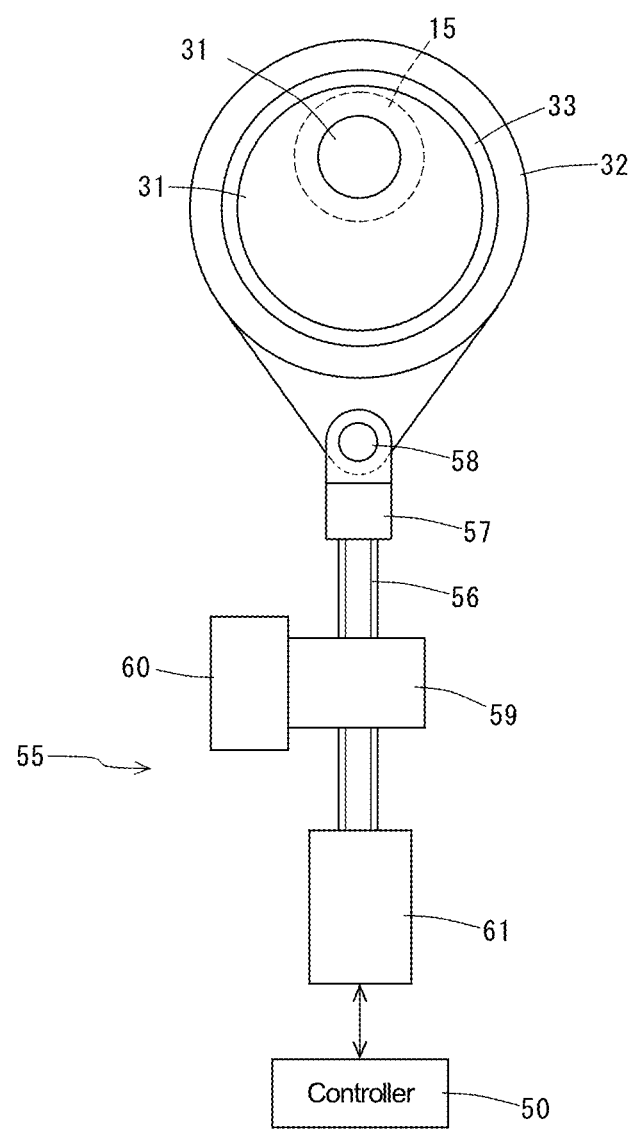
FIG. 7 is an illustrative diagram schematically showing a configuration of a balance imparting mechanism in another embodiment of the present invention.

Further, a load imparting unit 55 as illustrated in FIG. 7 may be provided instead of the above-described load imparting unit 35. As illustrated in FIG. 7, the load imparting unit 55 consists of a ball screw 56 arranged to be rotatable about the axis thereof and connected at one end thereof to the lower end of the housing 32 via a rotary joint 57, a ball nut 59 screwed with the ball screw 56, a support member 60 supporting the ball nut 59, and a drive motor 61 connected to the other end of the ball screw 56 to rotate the ball screw 56. The rotary joint 57 is connected to the lower end of the housing 32 via a pin 58 to be pivotable about an axis parallel to the axis of the first rotary shaft 15 (i.e., about the axis of the pin 58). The drive motor 61 is operationally controlled by the controller 50.

In this load imparting unit 55, the drive motor 61 is driven under control by the controller 50 and the ball screw 56 is rotated by the drive motor 61. Thereby, the ball screw 56 is moved in the axial direction thereof in accordance with the screwing with the ball nut 59 and a balance torque corresponding to a thrust of the ball screw 56 is imparted to the first rotary shaft 15 via the housing 32 and the eccentric disc 31. In this manner, the load imparting unit 55 provides the same effect as that provided by the above-described load imparting unit 35.

Further, in this case, the controller 50 may monitor a load acting on the drive motor 20 and control an output of the drive motor 61 such that the load falls within a predetermined allowable range, so that it is possible to impart to the first rotary shaft 15 a more exact balance load which cancels out the unbalanced torque acting on the first rotary shaft 15 and the drive motor 20. In this manner, the load acting on the drive motor 20 due to the unbalanced torque is reduced more appropriately.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Table device
2 Table
10 Supporting mechanism
11 Support base
15 First rotary shaft
16 Second rotary shaft
17 First support frame
18 Second support frame
20 Drive motor
21 Rotor
22 Stator
30 Balance imparting mechanism
31 Eccentric disc
32 Housing
33 Bearing
35 Load imparting unit
36 Hydraulic cylinder
36a Piston rod
37 Cylinder
38 Hydraulic unit
39 Pin
50 Controller

The invention claimed is:

1. A table device comprising:
a table for placing a workpiece thereon;
a supporting mechanism including a rotary shaft and supporting the table so as to be able to rock the table about an axial center of the rotary shaft;
a first drive motor configured to rotate the rotary shaft of the supporting mechanism to rock the table;
a balance imparting mechanism configured to impart a balance load to the rotary shaft in accordance with a position of rocking of the table; and
a controller configured to control the first drive motor, wherein:
the balance imparting mechanism includes:
an eccentric disc having a circular plate shape and connected at a position eccentric from a center thereof to the rotary shaft;
a housing holding an outer periphery of the eccentric disc via a bearing; and
a load imparting unit configured to impart the balance load to the housing in a direction intersecting an axis of the rotary shaft.

2. The table device according to claim 1, wherein the rotary shaft of the supporting mechanism is arranged parallel to a placement surface of the table.

3. The table device according to claim 2, wherein:
the load imparting unit comprises a hydraulic cylinder;
the hydraulic cylinder has a cylinder connected to the housing and has a piston rod supported by a support member; and
either a connection between the cylinder and the housing or a connection between the piston rod and the support member is connected in a relatively pivotable manner.

4. The table device according to claim 2, wherein:
the load imparting unit comprises a hydraulic cylinder;
the hydraulic cylinder has a piston rod connected to the housing and has a cylinder supported by a support member; and
either a connection between the piston rod and the housing or a connection between the cylinder and the support member is connected in a relatively pivotable manner.

5. The table device according to claim 2, wherein:
the load imparting unit comprises:
a ball screw supported to be rotatable about an axis thereof and connected at one end thereof to the housing;
a ball nut screwed with the ball screw;
a support member supporting the ball nut; and
a second drive motor configured to rotate the ball screw;
the second drive motor is controlled by the controller; and
a connection between the housing and the ball screw is connected in a relatively pivotable manner.

6. The table device according to claim 5, wherein the controller is configured to monitor a load acting on the first drive motor and control an output of the second drive motor such that the load falls within a predetermined allowable range.

7. The table device according to claim 1, wherein:
the load imparting unit comprises a hydraulic cylinder;
the hydraulic cylinder has a cylinder connected to the housing and has a piston rod supported by a support member; and
either a connection between the cylinder and the housing or a connection between the piston rod and the support member is connected in a relatively pivotable manner.

8. The table device according to claim 1, wherein:
the load imparting unit comprises a hydraulic cylinder;
the hydraulic cylinder has a piston rod connected to the housing and has a cylinder supported by a support member; and
either a connection between the piston rod and the housing or a connection between the cylinder and the support member is connected in a relatively pivotable manner.

9. The table device according to claim 1, wherein:
the load imparting unit comprises:
a ball screw supported to be rotatable about an axis thereof and connected at one end thereof to the housing;
a ball nut screwed with the ball screw;
a support member supporting the ball nut; and
a second drive motor configured to rotate the ball screw;
the second drive motor is controlled by the controller; and
a connection between the housing and the ball screw is connected in a relatively pivotable manner.

10. The table device according to claim 9, wherein the controller is configured to monitor a load acting on the first drive motor and control an output of the second drive motor such that the load falls within a predetermined allowable range.

11. The table device according to claim 1, wherein:
the rotary shaft is hollow, and
the eccentric disc having an opening corresponding to the hollow of the rotary shaft.

* * * * *